April 12, 1960  G. F. THOMAS  2,932,728
FLUORESCENT LIGHTING FIXTURE SYSTEM
Filed May 28, 1956  7 Sheets-Sheet 1

GALE F. THOMAS,
INVENTOR.
By His Attorneys
HARRIS, KIECH, FOSTER & HARRIS.

April 12, 1960 G. F. THOMAS 2,932,728
FLUORESCENT LIGHTING FIXTURE SYSTEM
Filed May 28, 1956 7 Sheets-Sheet 5

GALE F. THOMAS,
INVENTOR.
By His Attorneys.
HARRIS, KIECH, FOSTER & HARRIS.

April 12, 1960 G. F. THOMAS 2,932,728
FLUORESCENT LIGHTING FIXTURE SYSTEM
Filed May 28, 1956 7 Sheets-Sheet 6

GALE F. THOMAS,
INVENTOR.
By His Attorneys.
HARRIS, KIECH, FOSTER & HARRIS.

April 12, 1960

G. F. THOMAS 2,932,728

FLUORESCENT LIGHTING FIXTURE SYSTEM

Filed May 28, 1956

GALE F. THOMAS,
INVENTOR.

By His Attorneys

HARRIS, KIECH, FOSTER & HARRIS.

United States Patent Office 2,932,728
Patented Apr. 12, 1960

2,932,728

FLUORESCENT LIGHTING FIXTURE SYSTEM

Gale F. Thomas, Inglewood, Calif., assignor to Smoot-Holman Company, Inglewood, Calif., a corporation of California Application May 28, 1956, Serial No. 587,551

12 Claims. (Cl. 240—9)

This invention relates to lighting fixtures and in particular to fixtures which are adapted to receive one or more fluorescent lamps.

It is an object of the invention to provide a lighting fixture which will produce the desired illumination over a large area but which will occupy a very small area so as to provide substantially no interference with reflected light from the ceiling nor with the acoustical properties of the ceiling nor with fire extinction equipment installed at the ceiling level.

Another object of the invention is to provide a lighting fixture having a plurality of long narrow lamp housings which are distributed across a room or the like in spaced parallel rows so that even though the fixture occupies a very small portion of the total ceiling area, the apparent ceiling brightness is quite low due to the louver effect produced by the spaced parallel housings.

It is a further object of the invention to provide a lighting fixture which is inexpensive to manufacture, simple to install and wire and easy to maintain. Another object of the invention is to provide such a lighting fixture having a minimum of horizontally disposed surfaces. A further object of the invention is to provide such a fixture in which the lamps and the light diffusing elements, if used, may be installed from below after the fixture has been suspended in position.

It is another object of the invention to provide a lighting fixture in which the lamp housings and the ballast boxes comprise separate structures positioned transverse to each other, thereby isolating the heat produced by the ballast units and also making the lighting fixture a rigid unitary structure. Another object of the invention is to provide such a lighting fixture having two parallel spaced wire ways in each lamp housing so that the relatively high temperature resistant wire connected to the ballast units may be isolated from the wires used with the remainder of the fixture.

It is an object of the invention to provide a lamp housing for a lighting fixture having spaced vertical outer side members and spaced vertical inner side members with the corresponding inner and outer side members joined adjacent their upper edges and having means for supporting a light diffusing panel with the spacing between the lower edges of the inner side members being less than the width of the light diffusing panel so that the panel will be spring clamped within the housing.

The invention also comprises novel details of construction and novel combinations and arrangements of parts, which will more fully appear in the course of the following description. The drawings merely show and the description merely describes preferred embodiments of the present invention which are given by way of illustration or example.

Identical parts appearing in the various drawings are identified by the same numeral.

Figure 1:
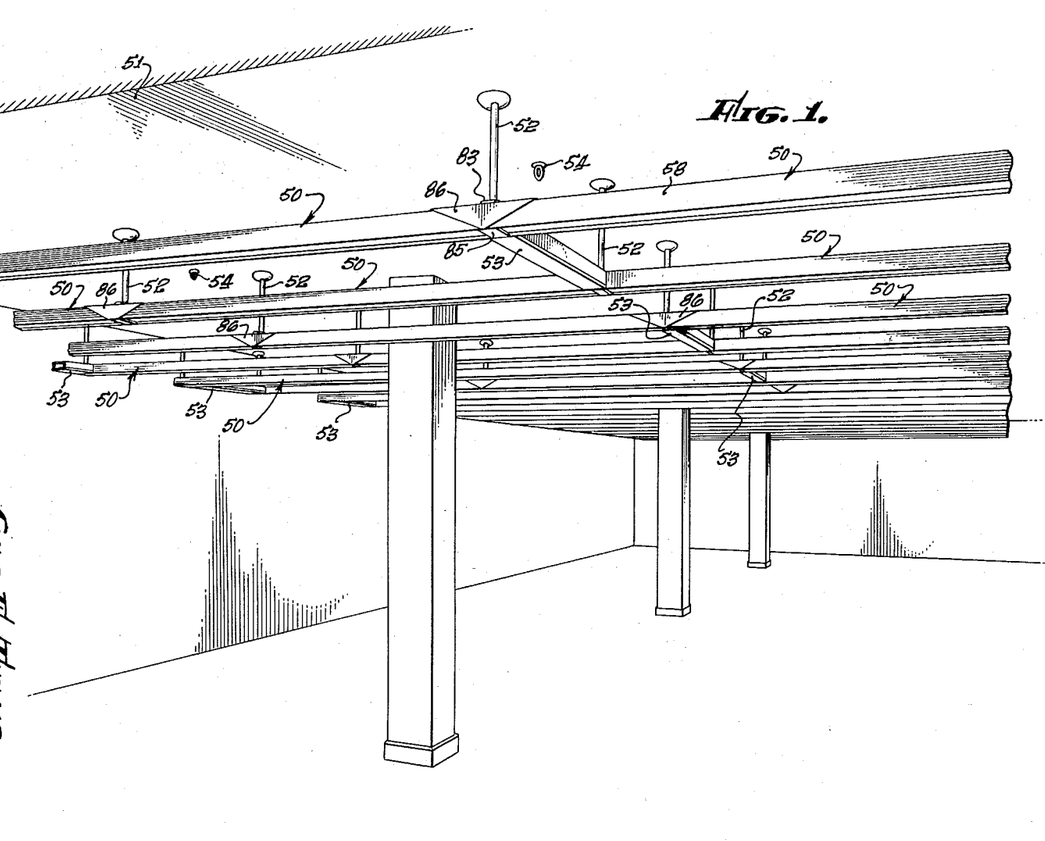
Fig. 1 shows a portion of a room having a preferred embodiment of the invention installed therein.

The lighting fixture of Fig. 1 includes a plurality of long narrow lamp housings 50 which are suspended from a ceiling 51 and which are arranged in spaced parallel groups with each of the groups consisting of a plurality of the housings aligned end-to-end. Each lamp housing is adapted to receive a fluorescent lamp and is supported by suspension tubes 52 which depend from the ceiling 51 and which are coupled to the housing at the junctions of the end-to-end aligned housings. Ballast boxes 53 are positioned transversely between the spaced parallel housings at regular intervals throughout the structure. The ballast boxes are adapted to contain the ballast units which are connected in circuit with the fluorescent lamps and also serve to make the lighting fixture a rigid structure, the ballast boxes being fixed to the lamp housings.

This lighting fixture occupies a very small horizontal area and yet produces the desired level of illumination. This is an important feature of the fixture since it permits the use of overhead fire extinction units, such as sprinkler heads 54. Also the ceiling of the room in which the fixture is installed may be provided with any desired acoustical characteristic and the lighting fixture will not materially alter the performance thereof. Another important advantage of this form of construction is the fact that the lighting fixture does not interfere with the illumination reflected from the ceiling. It is noted that the lighting fixture of the invention can be made to have the same illumination characteristics as the luminous ceiling type of installation which cannot have any of the desired advantages discussed above.

If desired, the ballast boxes may be positioned remote from the lamp housings, such as above the ceiling from which the housings are suspended, with the wiring between ballast boxes and housing being run through the suspension tubes.

Figure 3:
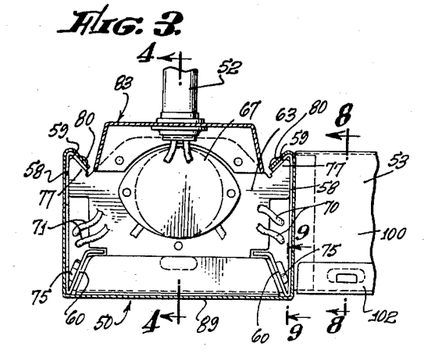
Fig. 3 is a sectional view taken along the line 3—3 of Fig. 2.
Figure 4:
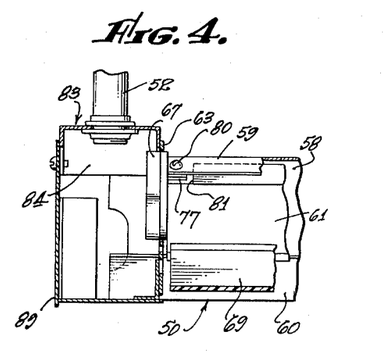
Fig. 4 is a sectional view taken along the line 4—4 of Fig. 3.
Figures 10, 11, 12, 13, 14, 15, 16, 17, 18, 19:
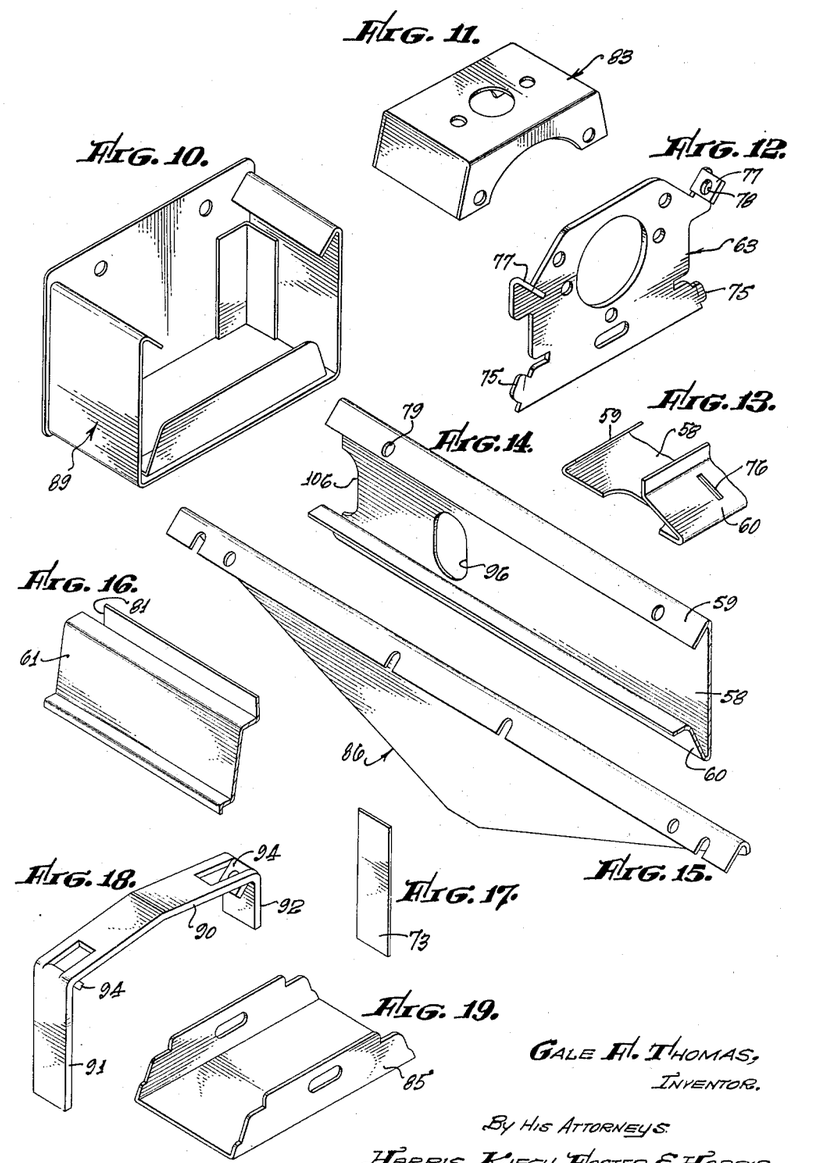
Figs. 10 through 20 are isometric views of various components of the fixture of Fig. 2.

Each of the housings 50 includes a pair of longitudinally extending vertical outer side member 58 having inwardly bent upper edges 59 and lower edges 60 (Figs. 7, 13 and 14), a pair of longitudinally extending vertical inner side members 61 clamped to the outer side members 58 at the upper edges thereof by screws 62 (Figs. 7 and 16) and a pair of socket brackets 63 positioned between the outer side members at each end thereof (Figs. 3 and 12). Sockets 66 and 67 are carried in the socket brackets 63 at each end of each of the housings respectively, the socket 66 having a spring loaded center plate permitting insertion of a fluorescent lamp 68 between each pair of sockets.

Figures 5, 6:
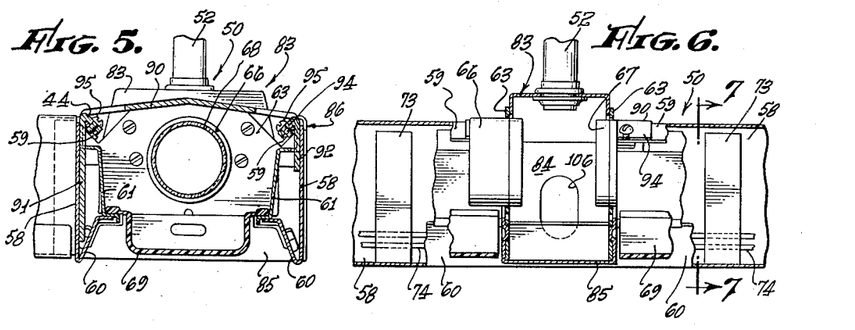
Fig. 5 is a sectional view taken along the line 5—5 of Fig. 2.
Fig. 6 is a sectional view taken along the line 6—6 of Fig. 2.
Figures 7, 9:
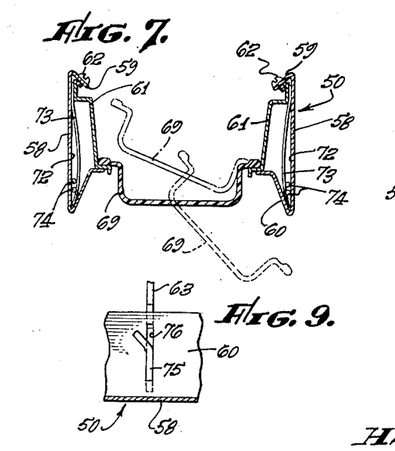
Fig. 7 is a sectional view taken along the line 7—7 of Fig. 6.
Fig. 9 is a partial sectional view taken along the line 9—9 of Fig. 3.
Figure 8:
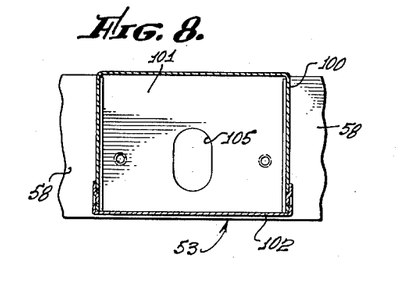
Fig. 8 is a sectional view taken along the line 8—8 of Fig. 3.

As best shown in Figs. 5 and 7 a bottom panel 69 is positioned between and supported by the inner side members 61, the bottom panel preferably being made of a translucent material to diffuse the light passing therethrough. The over-all width of the bottom panel is slightly greater than the distance between the inner side members at the point where they engage the bottom panel. Therefore, when the bottom panel is in place, the inner side members are flexed away from each other and exert a clamping force on the bottom panel to maintain it in position and prevent vibration and rattling. The lamp housing is designed so that both the lamp 68 and the bottom panel 69 may be inserted from below after the fixture including all the housings has been suspended from a ceiling. In Fig. 7, the bottom panel 69 is shown being inserted between the inner side members in three steps, the dashed lines indicating the first position, the dot-dash lines indicating a second position and the solid lines indicating the final position. As can be seen in Figs. 5 and 7, the lower surface of the bottom panel 69 is formed so that it does not extend downward as far as the lower edges of the outer side members 58. When a lamp housing is viewed from across a room, as shown in Fig. 1, the viewer will see the outside surface of the outer side member rather than the bottom panel, thereby materially reducing the direct radiation and glare which the viewer normally is exposed to. This form of construction and installation is especially suitable for use in an area where all of the working positions have the same orientation so that the lamp housings may be installed transverse to the normal line of sight.

The inner wall of each of the inner side members 61 is preferably provided with a light reflecting surface to increase the amount of light available from the fixture. As can be seen in Figs. 5 and 7, the housing does not interfere with the major portion of the light produced therein, and also the major portion of that which is intercepted by the housing is reflected from the inner side members.

Isolated chambers or wire ways 72 (Fig. 7) are provided between the outer side members 58 and the inner side members 61 with each housing having two separate wire ways, one on each side. Spring clips 73 may be used to clamp wires 74 against the inner wall of the outer side member 58 to prevent movement of the wire due to vibration or the like (Figs. 7 and 17).

A considerable amount of heat is generated in the ballast unit of a fluorescent lighting fixture. Therefore, in conventional fixtures wherein the ballast unit is mounted adjacent the lamps, it is necessary that high temperature resistant wire be used in wiring the fixture. In the lighting fixture of Fig. 1, the ballast units are positioned in the ballast boxes 53 between the spaced groups of housings, thereby isolating the heat sources from the remainder of the fixture. Then only the wires which are connected to the ballast units need be high temperature resistant, these wires being run in the wire ways adjacent the ballast boxes. The remainder of the wiring in the fixture may be carried out with wire having poorer temperature resistant characteristics which is also less expensive, this wiring being positioned in the wire ways on the opposite side of the housings from the ballast boxes. See for example, Fig. 3, where high temperature resistant wires 70 running to the ballast box 53 are in the inner wire way and lower temperature resistant wires 71 running to the other end of the housing are in the outer wire way.

Each socket bracket 63 has lower tabs 75 which are passed through slots 76 in the lower edges 60 of the outer side members 58, the tabs then being bent over to lock the units together (Figs. 3, 9, 12 and 13). Each of the socket brackets also has upper tabs 77 with holes 78 therein corresponding to holes 79 in the upper edges 59 of the outer side members 58, the components being joined by screws 80 positioned in the holes 78 and 79, upper corners 81 of the inner side members 61 being removed to provide clearance (Figs. 4, 12, 14 and 16). Thus each housing 50 is composed of four components, namely, two outer side members 58 and two socket brackets 63, rigidly and simply connected together.

Figure 2:
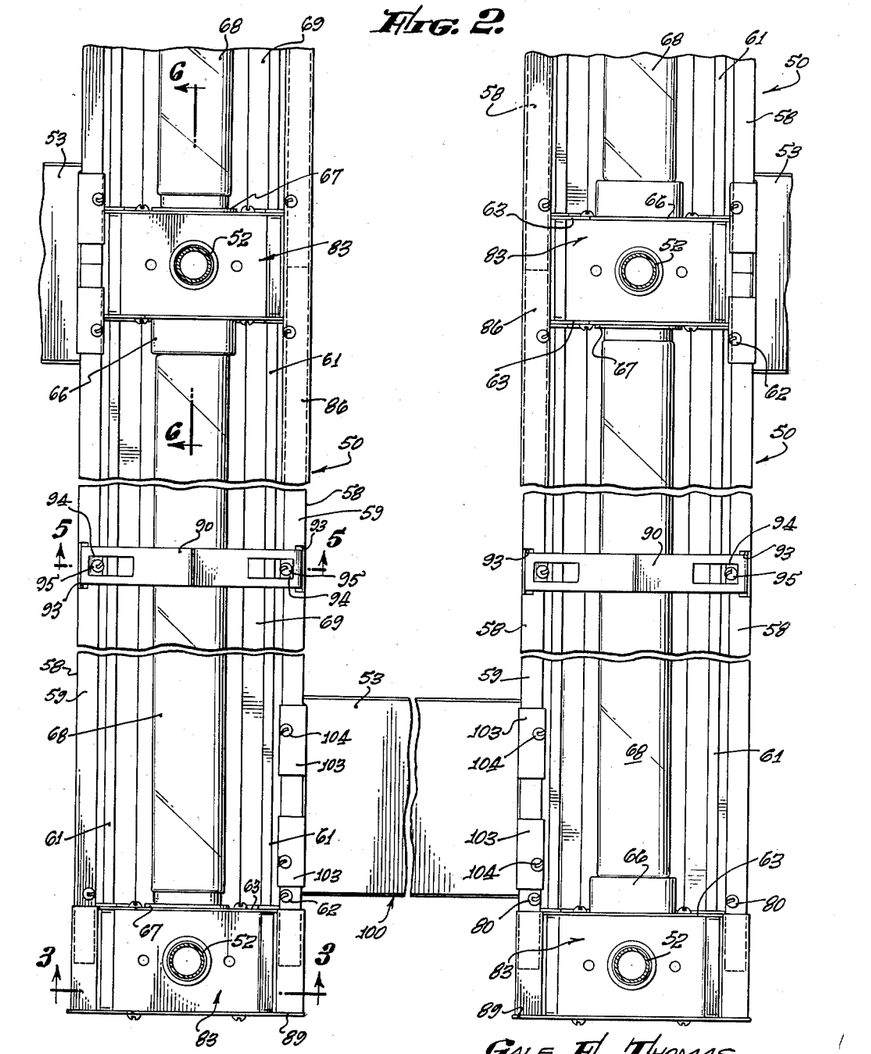
Fig. 2 is a top view of a portion of the lighting fixture of Fig. 1.

Two of the housings 50 may be joined in end-to-end alignment by connecting the adjacent socket brackets 63 to a hanger base 83 by suitable means such as screws (Figs. 2, 6 and 11). Each hanger base may be carried at the end of a suspension tube 52 which supports the fixture from the ceiling and also provides a means for running wires to the fixture. The hanger base 83 with the attached socket brackets 63 and the outer side members 58 define a chamber 84 in which the necessary wire splices may be contained. The ends of the wires to be spliced may be extended downward through the bottom of the chamber 84 in order to make the splices easily from below the fixture. Then the spliced wires may be tucked into the chamber 84 and the bottom thereof covered with a snap-on bottom cover 85 (Figs. 6 and 19). Connector plates 86 may be attached to the outer side members 58 of the aligned housings to conceal the joint between the housings and to strengthen the joint (Figs. 1, 2, 5 and 15).

End boxes 89 are mounted on the hanger bases 83 at the ends of the aligned groups of housings after the wire connections have been made to enclose the ends of the fixture (Figs. 2, 3, 4 and 10). Cross straps 90 may be mounted between the outer side members of a housing, preferably midway between the ends of the housing, to re-enforce the structure and also serve as a handle for lifting purposes (Figs. 2, 5 and 18). The cross strap 90 is U-shaped with downwardly extending legs 91, 92 which pass through openings 93 (Fig. 2) in the upper edge of the outer side members 58. Tabs 94 are bent downward at each corner of the strap 90 to correspond with the upper edges 59 of the outer side members 58 for attaching the straps to the side members by suitable means such as screws 95. The leg 92 of the strap is made shorter than the leg 91 so that when the strap is positioned opposite an opening in the outer side member, such as the opening 96 (Fig. 14), the leg will not obstruct the passage of wire therethrough.

Figure 20:
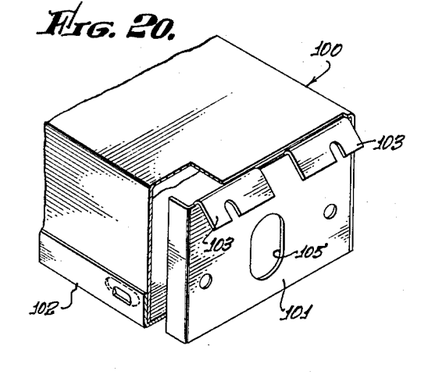

Each of the ballast boxes 53 includes an inverted channel section 100, vertical end pieces 101 fixed at each end of the channel by suitable means such as spot welding, and a snap on bottom cover 102, the end pieces 101 being provided with downwardly bent upper flaps 103 by which the ballast box is joined to the upper edges 59 of outer side members 58 by screws 104 (Figs. 2, 3 and 20). An opening 105 is provided in each end piece 101 corresponding to the openings 96 and 106 in the outer side members 58 permitting passage of wires to and from the ballast boxes.

The only component of the lighting fixture which has any substantial horizontal area is the bottom panel 69 and these panels may be removed from below for cleaning thereby reducing maintenance cost to a minimum.

Figure 21:
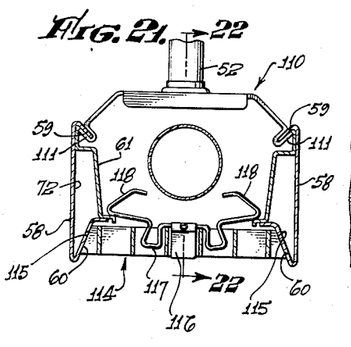
Figs. 21 through 25 show alternative embodiments of certain components of the fixture of Fig. 2.
Figure 22:
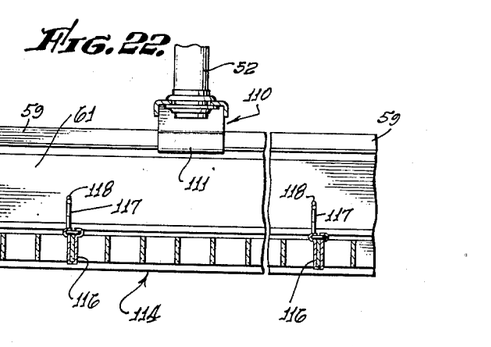
Figure 23:
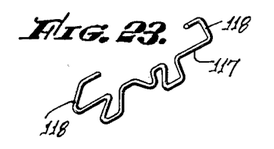
Figure 24:
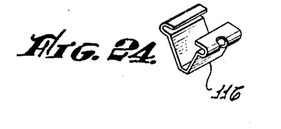
Figure 25:
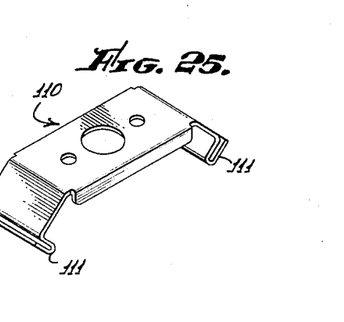

An alternative structure for supporting the lighting fixture from a ceiling is shown in Figs. 21, 22 and 25, wherein a hanger plate 110 is fixed to the lower end of the suspension tube 52 and is provided with opposed sloping channels 111 which engage and are slidable along the upper edges 59 of the opposed outer side members 58. This type of hanger plate is especially adapted for use where the suspension tubes 52 cannot be spaced apart a distance corresponding to the length of a housing and therefore cannot be coupled into the hanger bases 83 which also serve to connect the end-to-end aligned housings.

An alternative form of bottom panel is shown in Figs. 21 through 24, wherein a bottom panel 114 is composed of an open grid having vertically disposed walls, the structure sometimes being referred to as an egg crate panel. Tapered sides 115 of the bottom panel 114 engage the lower edges 60 of the outer side members 58 and are maintained in position by clips 116 and springs 117, the springs being fixed to the panels by the clips which wrap around one of the vertical sides of the egg crate panel. When installing the bottom panels 114 from below, the springs 117 are compressed by engagement of tapered outer sections 118 with the lower edges of the inner side members 61. After the compressed spring passes upward past the narrowest point, the spring expands slightly to fix the panel in position as shown in Fig. 21.

Figure 35:
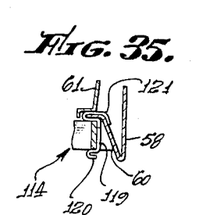
Figs. 35 and 36 show an alternative embodiment of the clip of Fig. 24.
Figure 36:
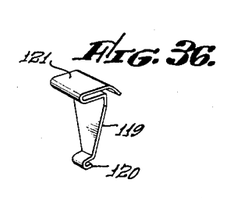

In an alternative arrangement for supporting the bottom panel 114, a plurality of clips 119 each having a lower flange 120 and an upper flange 121 forming a groove corresponding to the lower edge 60 of the outer side member 58 (Figs. 35 and 36), are positioned along the outer side members between the tapered sides 115 of the bottom panel with the vertical walls of the panel resting on the lower flanges 120 of the clips. Opposing clips may be sprung away from each other permitting insertion and removal of a bottom panel.

Figures 26, 27:
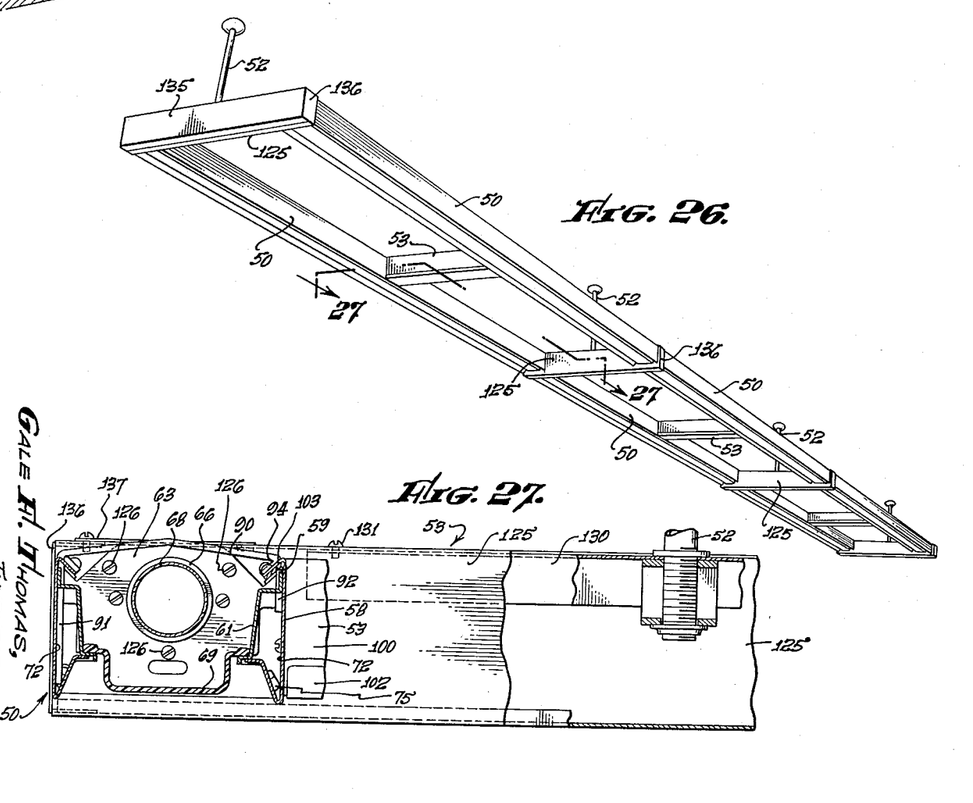
Fig. 26 shows an alternative embodiment of the installation of Fig. 1.
Fig. 27 is a sectional view taken along the line 27—27 of Fig. 26.
Figures 28, 29, 30, 31, 32, 33, 34:
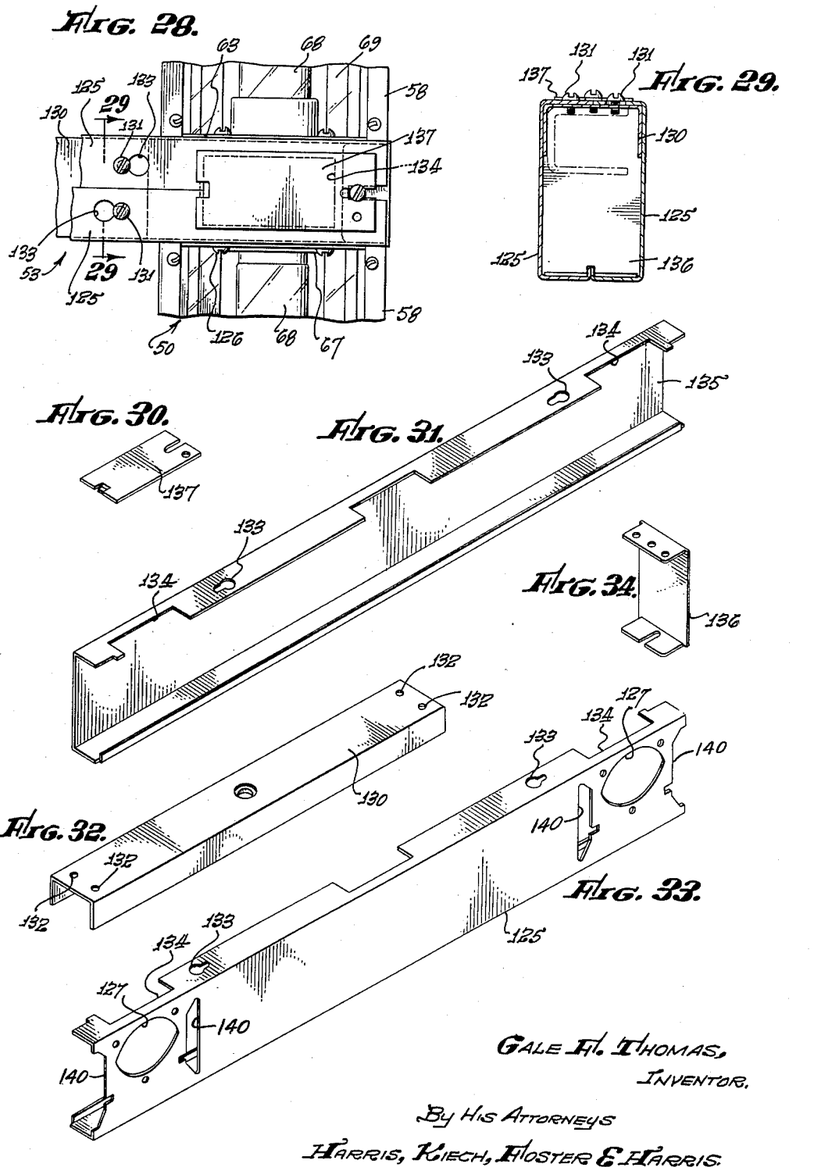
Fig. 28 is a top view of a portion of the fixture of Fig. 26.
Fig. 29 is a sectional view taken along the line 29—29 of Fig. 28.
Figs. 30 through 34 are isometric views of various components of the fixture of Fig. 26.

An alternative embodiment of the lighting fixture of Fig. 1 is shown in Figs. 26 through 34 wherein the housings 50 and ballast boxes 53 of the first embodiment are arranged in a different manner to provide a structure which is easily and rapidly installed and connected. Two housings 50 are fixed in a spaced side-to-side arrangement by a ballast box 53 and two cross support plates 125 which preferably are channel sections, the cross support plates being positioned at the ends of the housings and the ballast box being positioned midway between the ends thereof (Figs. 26, 27 and 33). Each housing 50 includes a cross strap 90 with the short leg 92 positioned adjacent the ballast box 53, as seen in Fig. 27. The housings are attached to the cross support plates by screws 126 which join the socket brackets 63 to the cross support plates with the sockets passing through clearance holes 127 and with the sides 58 passing through corresponding apertures 140 in the end plates 125 to extend into the interior of the channel in the same manner as the sides go through the socket plates 63 into the chamber 84 in the embodiment of Fig. 1.

The structure consisting of two housings 50, a ballast box 53 and two cross support plates 125, may be assembled and wired at the factory prior to installation, such a structure being referred to as a fixture unit herein. Each fixture unit is supported between two hanger beams 130, which are suspended from the ceiling by the suspension tubes 52. In installing a fixture unit, the hanger beams are first suspended in position with screws 131 inserted in threaded openings 132 in the hanger beam, space being left between the heads of the screws and the top surface of the beam. Then the fixture unit is positioned between the two beams, the heads of the screws 132 are passed through the larger portion of keyhole-shaped openings 133 in the cross support plates 125, the fixture unit is moved slightly to bring the body of the screw into the smaller portion of the keyhole-shaped openings and then the screws are tightened in position. After the fixture units are installed, the necessary wiring splices may be made with the wire ends extending sideways out of the open ends of the cross support plates or upward through openings 134 in the cross support plates. The open ends of the fixture units at each end of a series of aligned fixture units may be closed by end plates 135 (Fig. 31), which are identical to the cross support plates 125 except for the openings in the latter which engage the housings 50 and socket brackets 63.

The openings at the ends of the cross support plates are closed by end cover plates 136 (Figs. 28 and 34) and the top openings 134 are closed by top cover plates 137 (Figs. 28 and 30).

Thus it is seen that the factory assembled fixture units are quickly hung in place on the hanger beams, the wiring splices are easily made in the open and the spliced wires are contained in totally enclosed chambers at the ends of the units.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a lighting fixture adapted to receive a fluorescent lamp, the combination of: a pair of long, relatively narrow vertical outer side members having inwardly bent upper and lower edges; a pair of vertical transverse socket brackets positioned between and connected to said outer side members and adapted to hold said outer side members in spaced relation, said brackets being spaced apart lengthwise of said side members, each of said brackets having an end socket for a lamp and said brackets being adapted to receive a fluorescent lamp therebetween; a pair of substantially vertical inner side members, each of said inner side members being connected at its upper edge to the upper portion of one of said outer side members respectively, and depending therefrom, each of said inner side members being spaced from its adjacent outer side member to form a passage for electrical wiring therebetween; and a bottom horizontal panel extending the length of said inner side members and positioned therebetween and supported by one pair of said side members, the spacing between the inner side members at their lower edges being slightly less than the width of said bottom panel, said inner side members being sprung apart when said bottom panel is in position to spring hold the bottom panel in place.

2. In a lighting fixture adapted to receive a fluorescent lamp, the combination of: a pair of long, relatively narrow vertical outer side members having inwardly bent upper and lower edges; a pair of vertical transverse socket brackets positioned between and connected to said outer side members and adapted to hold said outer side members in spaced relation, said brackets being spaced apart lengthwise of said side members, each of said brackets having an end socket for a lamp and said brackets being adapted to receive a fluorescent lamp therebetween; a pair of substantially vertical inner side members, each of said inner side members being connected at its upper edge to the upper portion of one of said outer side members respectively, and depending therefrom, each of said inner side members being spaced from its adjacent outer side member to form a passage for electrical wiring therebetween; and a bottom horizontal panel extending the length of said inner side members and positioned therebetween and supported by said inner side members, the spacing between the inner side members at their lower edges being slightly less than the width of said bottom panel, said inner side members being sprung apart when said bottom panel is in position to spring hold the bottom panel in place, said bottom panel being rotatable about its longitudinal axis and movable downward between said side members.

3. In a lighting fixture for a room or the like, the combination of: a plurality of relatively long, relatively narrow lamp housings, each of said housings including spaced vertical parallel opaque sides and spaced opposing socket brackets positioned between said sides for supporting a fluorescent lamp therebetween, defining a housing having closed sides and ends and an open top and bottom for providing upward and downward radiation from said housing and blocking horizontal radiation; means for engaging said housings end-to-end in axial alignment; means for suspending said housings below a ceiling of a room, said housings being positioned in a horizontal plane in laterally spaced parallel groups, each group comprising a plurality of end-to-end aligned housings; and a plurality of ballast boxes positioned transverse to said housings and coupling the corresponding housings of adjacent groups.

4. In a lighting fixture, the combination of: a first longitudinal lamp housing generally rectangular in cross section and adapted to receive a fluorescent lamp; a second longitudinal lamp housing generally rectangular in cross section and adapted to receive a fluorescent lamp, each of said housings having parallel opaque sides joined adjacent their ends by transverse socket plates with lamp sockets mounted therein and having an open top and bottom, each of said sides having a longitudinal wire way therein; a ballast box adapted to receive a ballast unit; means for connecting said ballast box transversely between said housings and midway of the ends thereof, to hold said housings in parallel laterally spaced relationship forming a unitary structure and provide an inner and an outer wire way in each housing; and means for supporting said structure from a ceiling.

5. A light fixture as defined in claim 4, including wires having relatively low temperature resistance positioned in the outer wire ways for circuit connections between the sockets of the respective socket plates at the ends of the housings and wires having relatively high temperature resistance positioned in the inner wire ways for circuit connections between said ballast unit and the sockets of the respective socket plates at the ends of said housings.

6. In a lighting fixture, the combination of: a pair of lamp housings, generally rectangular in cross section, each of said housings having parallel sides joined adjacent their ends by transverse socket plates and adapted to support a fluorescent lamp therein, each of said sides having a longitudinal wire way therein; a hanger bracket for joining the socket plates of end-to-end aligned housings with the corresponding wire ways abutting and in longitudinal alignment, said hanger bracket, the joined socket plates and the abutting sides defining a wiring enclosure having an open bottom; a cover plate for engaging said socket plates and closing said open bottom; and means engaging said hanger bracket for supporting said housings from a ceiling.

7. In a lighting fixture, the combination of: a first longitudinal lamp housing generally rectangular in cross section and adapted to receive a fluorescent lamp; a second longitudinal lamp housing generally rectangular in cross section and adapted to receive a fluorescent lamp, each of said housings including longitudinally disposed sides joined adjacent their ends by transverse socket plates; a ballast box adapted to receive a ballast unit; means for connecting said ballast box transversely between said housings and midway of the ends thereof, to hold said housings in parallel, laterally spaced relationship; a first channel section comprising a base and parallel arms, with the socket plates of corresponding ends of said parallel housings being mounted against said base of said first channel section with said arms extending away from said housings, said base having four shaped apertures therein for slidingly receiving the sides of said housings; a second channel section comprising a base and parallel arms, the socket plates of the other ends of said parallel housings being mounted against said base of said second channel section with said arms extending away from said housings, said base having four shaped apertures therein for slidingly receiving the ends of said housings; a first horizontal beam adapted to be suspended from a ceiling for slidingly engaging the upper arm of one of said channel sections; and a second horizontal beam adapted to be suspended from the ceiling for slidingly engaging the upper arm of the other of said channel sections.

8. A lighting fixture as defined in claim 7 in which each of said horizontal beams is engageable with two oppositely oriented channel sections to suspend a plurality of said unitary structures in end-to-end alignment with the coengaged channel sections defining a parallelepiped zone for interwiring of the fixtures, with the outer sides of said end-to-end aligned housings abutting for closing the ends of said zone.

9. In a lighting fixture for a room or the like, the combination of: a plurality of relatively long, relatively narrow lamp housings, each of said housings including spaced, vertically disposed, parallel opaque sides and spaced, opposing socket brackets positioned between said sides for supporting a fluorescent lamp therebetween, defining a housing having closed sides and ends and an open top and bottom for providing vertical radiation from said housing and blocking horizontal radiation; means for engaging said housings end-to-end in axial alignment; means for suspending said housings below a ceiling of a room, said housings being positioned in a horizontal plane in laterally spaced parallel groups, each group comprising a plurality of end-to-end aligned housings with the spacing between groups many times greater than the spacing between the sides of a single housing; and a plurality of ballast boxes positioned transverse to said housings and coupling the corresponding housings of adjacent groups.

10. In a lighting fixture for a room or the like, the combination of: a plurality of relatively long, relatively narrow lamp housings, each of said housings having closed opaque sides and ends and an open top and bottom and adapted to support a tube lamp therein with the tube lamp between said sides such that horizontal radiation therefrom is blocked; a plurality of box-like transverse members, with at least two of said transverse members carried transversely between two housings providing a laterally spaced pair of housings with only said members therebetween, with the spacing between housings large relative to the width of a housing; means for engaging said spaced pairs end to end in axial alignment; and means for suspending said spaced pairs below a ceiling of a room.

11. In a lighting fixture, the combination of: a pair of lamp housings, generally rectangular in cross section, each of said housings having parallel sides joined adjacent their ends by transverse socket plates and adapted to support a fluorescent lamp therein, each of said sides having a longitudinal wire way therein; a hanger bracket for joining the socket plates of end-to-end aligned housings with the corresponding wire ways abutting and in longitudinal alignment, said hanger bracket, the joined socket plates and the abutting sides defining a wiring enclosure having an access opening; a cover plate for closing said opening; and means engaging said hanger bracket for supporting said housings from a ceiling.

12. In a lighting fixture, the combination of: a pair of lamp housings generally rectangular in cross-section, each of said housings comprising a pair of opposed parallel longitudinal side walls and having an open top and bottom; opposed sockets mounted on plates installed between the respective side walls at opposite ends of each housing for mounting fluorescent lamps longitudinally in the housings in laterally spaced relation with respect to said side walls, said side walls being formed of opaque material and being arranged to serve as barriers to prevent the horizontal passage of light laterally from said lamps, said side walls each having a longitudinal wire way therein; means connecting said housings in end-to-end relation with the corresponding wire ways in longitudinal alignment and connected together, said last-mentioned means having an opening therein to provide external access to said wire ways; and means for supporting said housings from a ceiling.

(References on following page)

References Cited in the file of this patent

UNITED STATES PATENTS

| | | | |
|---|---|---|---|
| 2,291,490 | Naysmith | July 28, | 1942 |
| 2,305,722 | Livers | Dec. 22, | 1942 |
| 2,329,268 | Heath | Sept. 14, | 1943 |
| 2,336,414 | Mitchell | Dec. 7, | 1943 |
| 2,543,713 | Yeager | Feb. 27, | 1951 |
| 2,564,373 | Potter | Aug. 14, | 1951 |
| 2,597,875 | Kruger | May 27, | 1952 |
| 2,621,285 | Nitardy | Dec. 9, | 1952 |
| 2,625,646 | Goebel | Jan. 13, | 1953 |
| 2,645,708 | Marchisio | July 14, | 1953 |
| 2,753,440 | Wakefield | July 3, | 1956 |
| 2,759,093 | Ferar et al. | Aug. 14, | 1956 |
| 2,807,709 | Guth | Sept. 24, | 1957 |

FOREIGN PATENTS

| | | | |
|---|---|---|---|
| 571,042 | Great Britain | Aug. 2, | 1945 |

OTHER REFERENCES

"Fluorescent Lamp Fixtures," Bulletin No. 95, May 20, 1939, page 3; published by Overbagh & Ayres, Chicago, Ill.